United States Patent [19]

Raman

[11] Patent Number: 5,579,223
[45] Date of Patent: Nov. 26, 1996

[54] METHOD AND SYSTEM FOR INCORPORATING MODIFICATIONS MADE TO A COMPUTER PROGRAM INTO A TRANSLATED VERSION OF THE COMPUTER PROGRAM

[75] Inventor: Suryanarayanan V. Raman, Redmond, Wash.

[73] Assignee: Microsoft Corporation, Redmond, Wash.

[21] Appl. No.: 996,705

[22] Filed: Dec. 24, 1992

[51] Int. Cl.⁶ .............................. G06F 17/24; G06F 17/28
[52] U.S. Cl. ............................................. 395/751; 395/798
[58] Field of Search ................................... 395/800, 700, 395/600; 364/419.01, 419.02, 419.08; 371/19; 346/419.16, 222.81, 286, 259.2, 280.4, 947.2, 973, 419.17

[56] References Cited

U.S. PATENT DOCUMENTS

| | | | |
|---|---|---|---|
| 3,711,863 | 1/1973 | Bloom | 371/19 |
| 4,595,980 | 6/1986 | Innes | 364/419.02 |
| 4,641,264 | 2/1987 | Nitta et al. | 364/419.04 |
| 4,706,212 | 11/1987 | Toma | 364/419.02 |
| 5,181,163 | 1/1993 | Nakajima et al. | 364/419.08 |
| 5,191,646 | 3/1993 | Naito et al. | 395/161 |
| 5,323,311 | 6/1994 | Fukao et al. | 364/419.02 |
| 5,325,531 | 6/1994 | McKeeman et al. | 395/700 |
| 5,416,903 | 5/1995 | Malcolm | 395/155 |

OTHER PUBLICATIONS

Frame, "A Lexical Comparison Program to Simplify the Maintenance of Portable Software", IEEE, 1988, pp. 348–350.

*Primary Examiner*—Thomas G. Black
*Assistant Examiner*—Jack M. Choules
*Attorney, Agent, or Firm*—Seed and Berry LLP

[57] ABSTRACT

A method and system for merging a first file with a second file to produce an output file, wherein the first and second files are uniquely modified versions of an original file, are discussed. In a preferred embodiment, a computer program can be efficiently developed with versions in multiple natural languages because modifications made in the original version are identified and incorporated into translated versions. The first and second files contain text instructions for controlling a computer system to output text in respective natural languages, and graphics instructions for controlling a computer system to output graphics. A merge utility determines the differences and similarities between the first and second files by comparing the text and graphics instructions of the files.

12 Claims, 9 Drawing Sheets

METHOD AND SYSTEM FOR INCORPORATING MODIFICATIONS MADE TO A COMPUTER PROGRAM INTO A TRANSLATED VERSION OF THE COMPUTER PROGRAM

TECHNICAL FIELD

This invention relates generally to a computer method and system for developing multiple natural language versions of a computer program or the like.

BACKGROUND OF THE INVENTION

To enjoy an international market, software developers produce many different versions of their computer program products so the product can be used by people who speak different languages. The internal workings of each version of the program are essentially the same, but the program's user interface and program manuals are translated into different languages. For example, a program originally created for an English speaking user may be translated into other languages before the program is shipped to other countries.

In the past, software developers designed, developed, and tested an original program in one language, then when the program was complete, began the process of translating the program into other languages to create translated or "localized" versions. Such prior translation systems are undesirable because either the release date of the original program is delayed to wait for translated versions to be completed, or the original program is released before the translated versions.

In the past, if translation of the original program into other languages was begun before the original program was completed, i.e., designed, coded, and tested, it was a tedious and time consuming operation to incorporate modifications made to the original program into the translated programs. This is partly because modifications to the original program are often made by different development teams so that "who modified what" is not always clearly documented. To incorporate modifications made to the original program into a translated program, prior methods required that an operator manually review every aspect of the original program's user interface and compare it to the translated program's user interface. Often, this process involved the operator simultaneously reviewing output from each program on a different computer output device.

After the operator had incorporated all of the modifications made to the original program into the translated program, the operator must again review the translated program's output to ensure that attributes of the translated program's output (i.e., graphics) were not affected by the modifications. For example, if text from an original program is modified, the modification of the corresponding text in a translated program can affect such things as borders surrounding the text. The border size is preferably adjusted if the modified translated text takes up more or less space than the translated text on a display screen. Resizing the border around the modified translated text can in turn affect the display of other objects.

It is desirable to have a system that enables a software developer to easily incorporate modifications made to an original program into a translated version of the original program, avoiding the drudgery associated with the above-described process. It is desirable that any modifications made to the original program be easily incorporated into the translated programs, so that all versions of the program can be released to the public at the same time.

SUMMARY OF THE INVENTION

The present invention provides a method and system for merging a first file with a second file to produce an output file, wherein the first and second files are modified versions of an original file and wherein modifications were made to the original file to create the first and second files. In the preferred embodiment described herein, a computer program designed for users of a first natural language can be translated into one or more other natural languages. Modifications can then be made in an on-going manner to the original program and efficiently transferred to the various translated versions.

In this preferred embodiment, the first and second files contain text instructions for controlling a computer system to output text, and graphics instructions for controlling a computer system to output graphics. The text output by the computer system at the request of the first file is output in a first natural language. The text output by the computer system at the request of the second file is output in a second natural language.

A merge utility provided by the present invention determines the differences and similarities between the first and second files by comparing the text instructions of the first file to the text instructions of the second file and by comparing the graphics instructions of the first file to the graphics instructions of the second file. The merge utility selects the text and graphics instructions that are in both the first and second files and merges these instructions to produce an output file. The merge utility additionally selects the text and graphics instructions that are in the first file but not the second file and copies these instructions into the output file.

DETAILED DESCRIPTION OF THE INVENTION

The present invention provides a method and system for merging a first file with a second file to produce an output file, wherein the first and second files are modified versions of an original file and wherein unique modifications were made to the original file to produce the first and second files. One skilled in the computer field will realize that the present invention may be used on numerous types of data files, such as a resource file. A resource file is an ASCII text file that contains resource data. Resource data includes data structures, templates, definition procedures, management routines, and so forth, associated with a particular resource. A resource can be used by more than one program or in more than one place in a program; for example, menus, windows, and dialog boxes are resources in many windowing programs.

The present invention can be used to merge parallel files that have the same basic structure. A good example of such files are files that contain a list of information stored as a sequence of named entities. In the preferred embodiment described herein, the first file is a modified version of the original file, the original file comprising instructions to control the output of text and graphics on a computer output device. In the context of the present invention, "modified" means that changes, such as additions, deletions, and alterations, have been made to a file. The second file is a translated version of the original file. In the context of the present invention, "translated" means that text has been translated from a first natural language to a second natural language, and any graphics affected by the text translation have been modified accordingly. The translated file and the original file are parallel files in that they are essentially the same except that each file includes instructions to control the output of text in different natural languages.

Figure 1A:
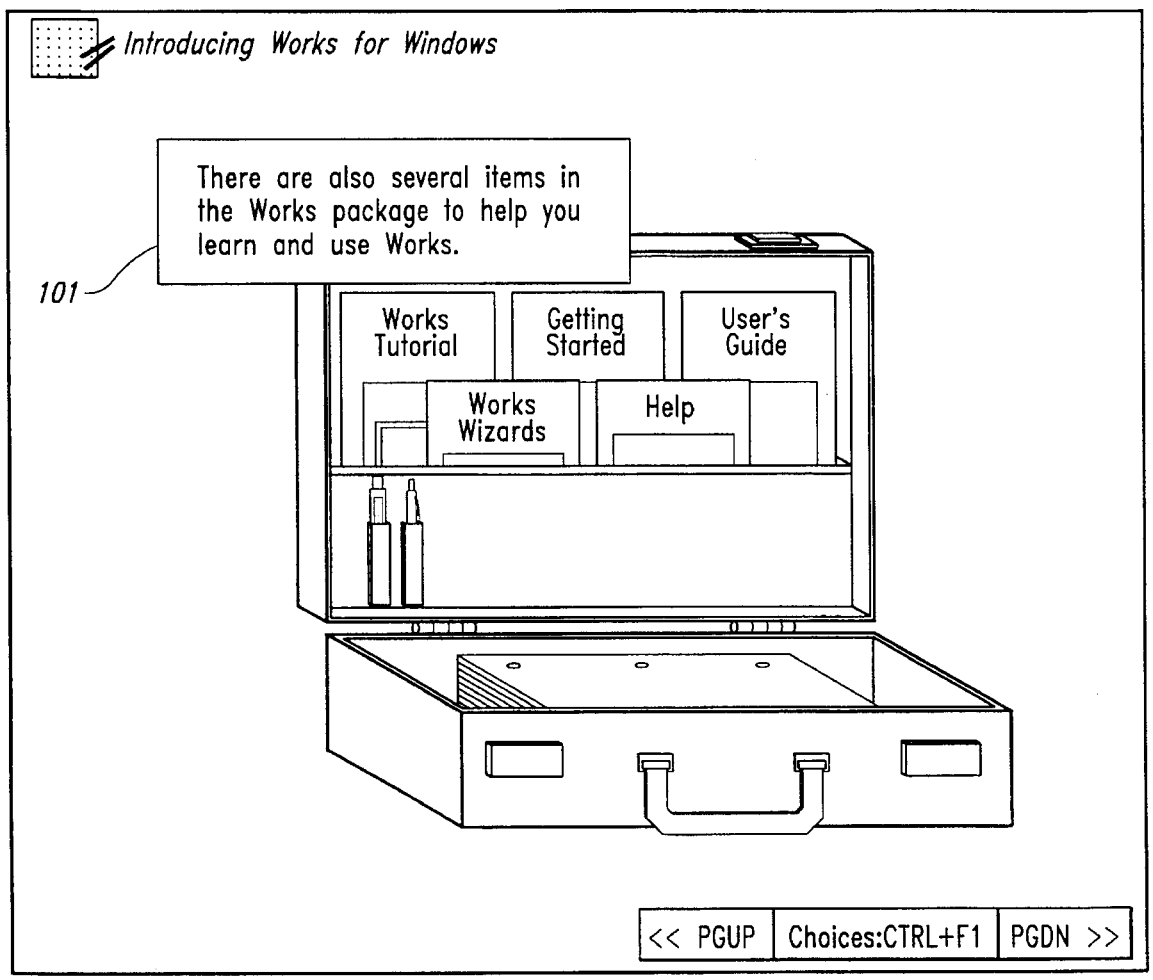
FIG. 1A is an illustration of an original program's output attributes including text written in the English language displayed on a computer output device.
Figure 1B:
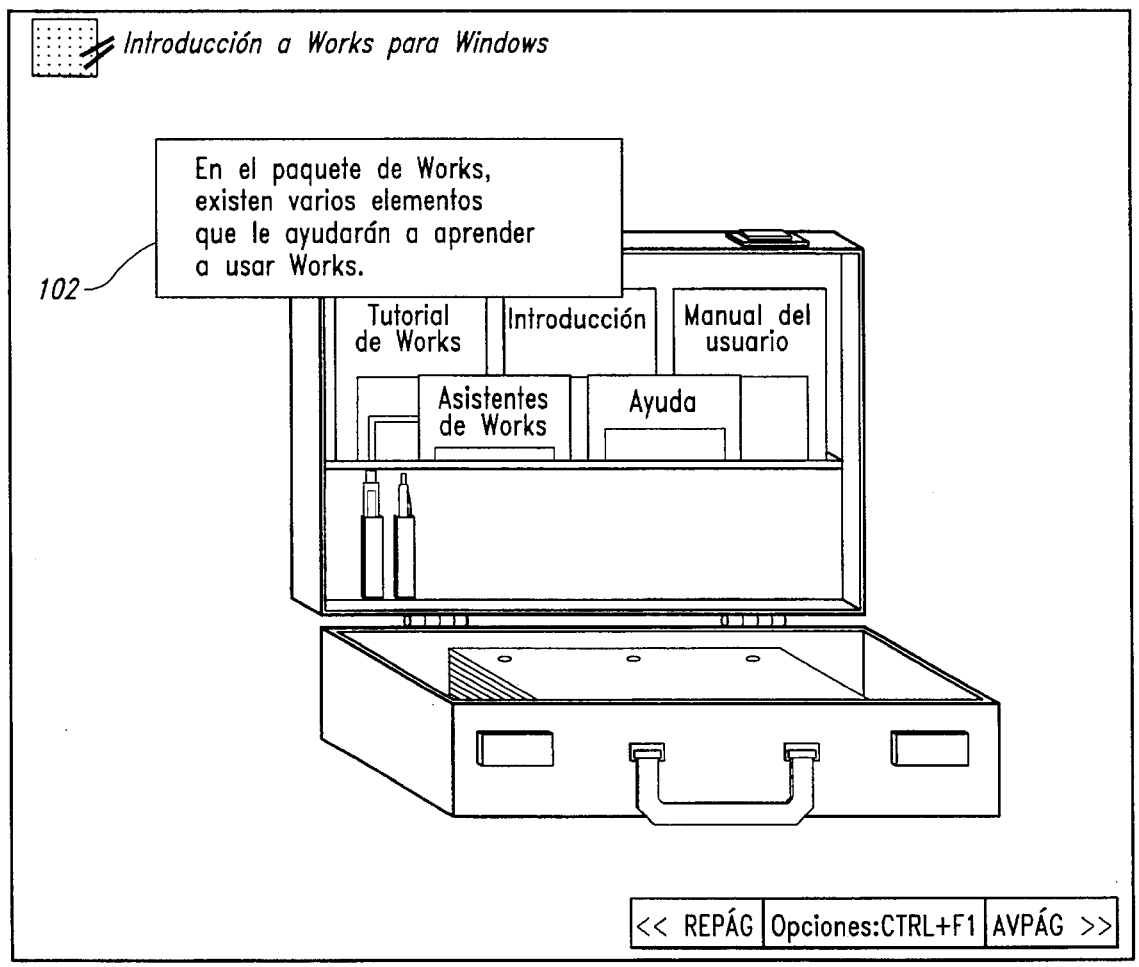
FIG. 1B is an illustration of the output attributes of a translated version of the program illustrated in FIG. 1A, including the text of FIG. 1A translated from the English language into the Spanish language, displayed on the computer output device of FIG. 1A.

FIG. 1A and 1B illustrate the similarities between a sample original file and a sample translated filed. FIG. 1A is an illustration of output from an original file, including text written in the English language. FIG. 1B is an illustration of output from a translated file, including the text of FIG. 1A translated from English to Spanish. Note how the text boxes 101, 102 in the versions differ in size. The Spanish text takes up more room than the English text.

The present invention provides a method and system for progressively incorporating modifications as they are made to the original file into the translated file. The modifications may include changes to the existing text and/or graphics. The preferred embodiment described herein does not automatically translate text from one natural language to another, rather, it marks changes that were made to the text, and modifies any graphics that might be affected by the text changes. A human translator then translates the modified text. Automatic translators can be used in applications where available and suitable.

Figure 2:
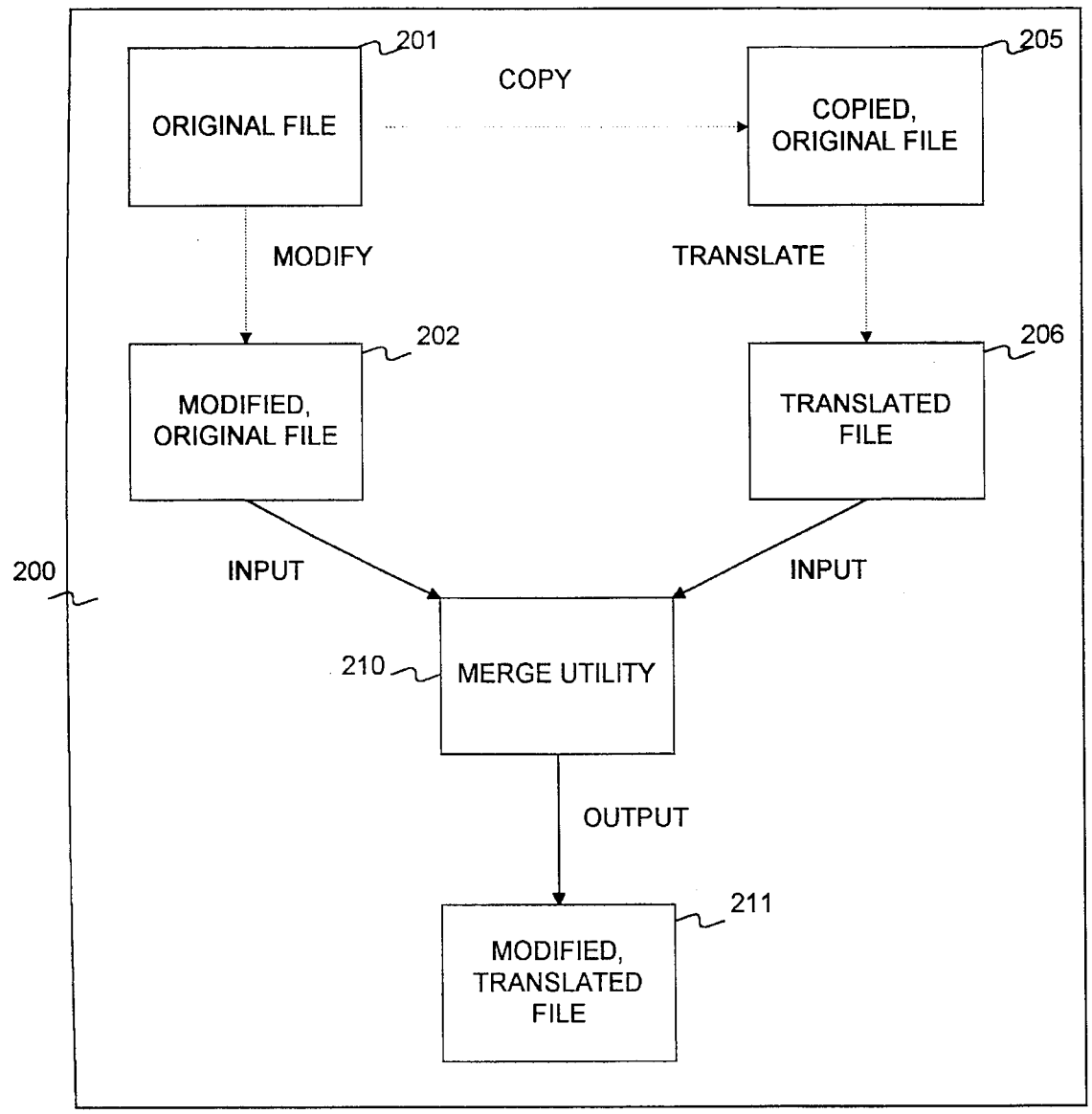
FIG. 2 is a block diagram of components in a preferred embodiment of the present invention including a computer system, an original file, a modified original file, a copied original file, a translated file, a merge utility, and a modified translated file.

FIG. 2 is a block diagram of components in the preferred embodiment described herein, including a computer system 200, an original file 201, a modified original file 202, a copied original file 205, a translated file 206, a merge utility 210, and a modified translated file 211. A software developer creates the original file 201 so that all text output of the original file 201 is in a first natural language. The software developer then makes a copy of the original file 201 to produce the copied original file 205. A translator then translates the text in a first natural language from the copied original file 205 a second natural language to create the translated file 206. After creation of the copied original file 205, the original file 201 is modified to produce the modified original file 202. Modifications may include changes to text and/or graphics, addition of new text and/or graphics, or deletion of text and/or graphics.

To incorporate the modifications made to the original file 201 and contained in the modified original file 202, into the translated file 206, the merge utility 210 examines the modified original file 202 and translated file 206. One preferred method to merge the modified original file 202 with the translated file 206 is explained below in reference to FIGS. 3 and 5. The merge utility 210 produces the modified translated file 211.

Figure 3:
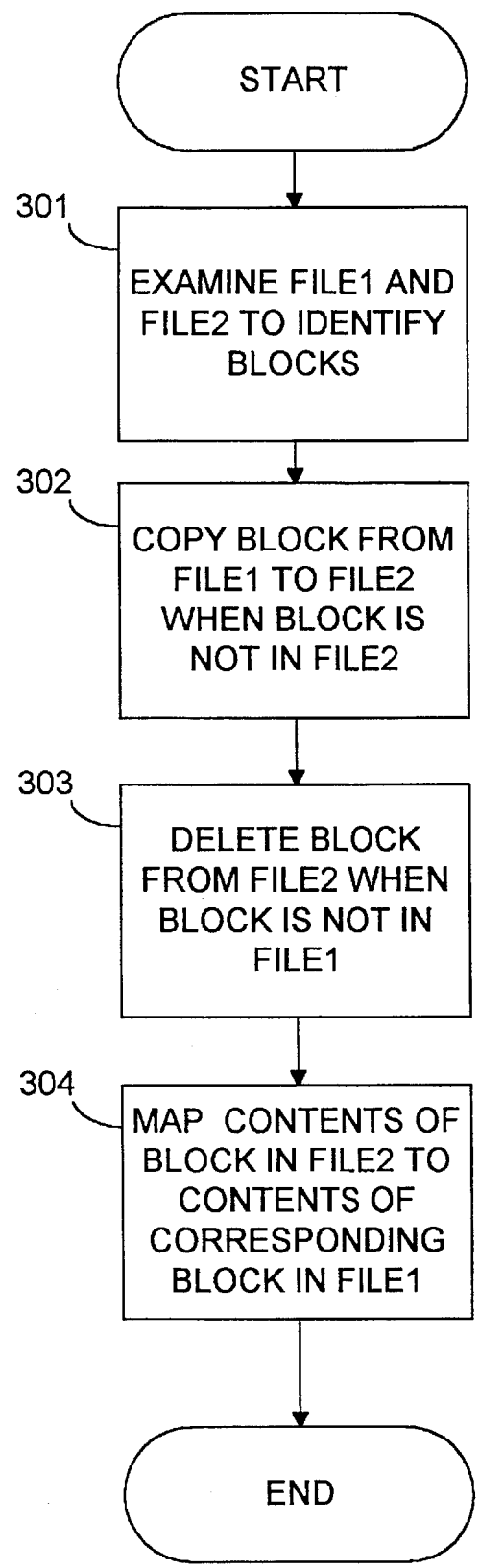
FIG. 3 is an overview flow diagram of a method used by the merge utility of FIG. 2 to merge the modified original file with the translated file to produce the modified translated file.
Figure 4:
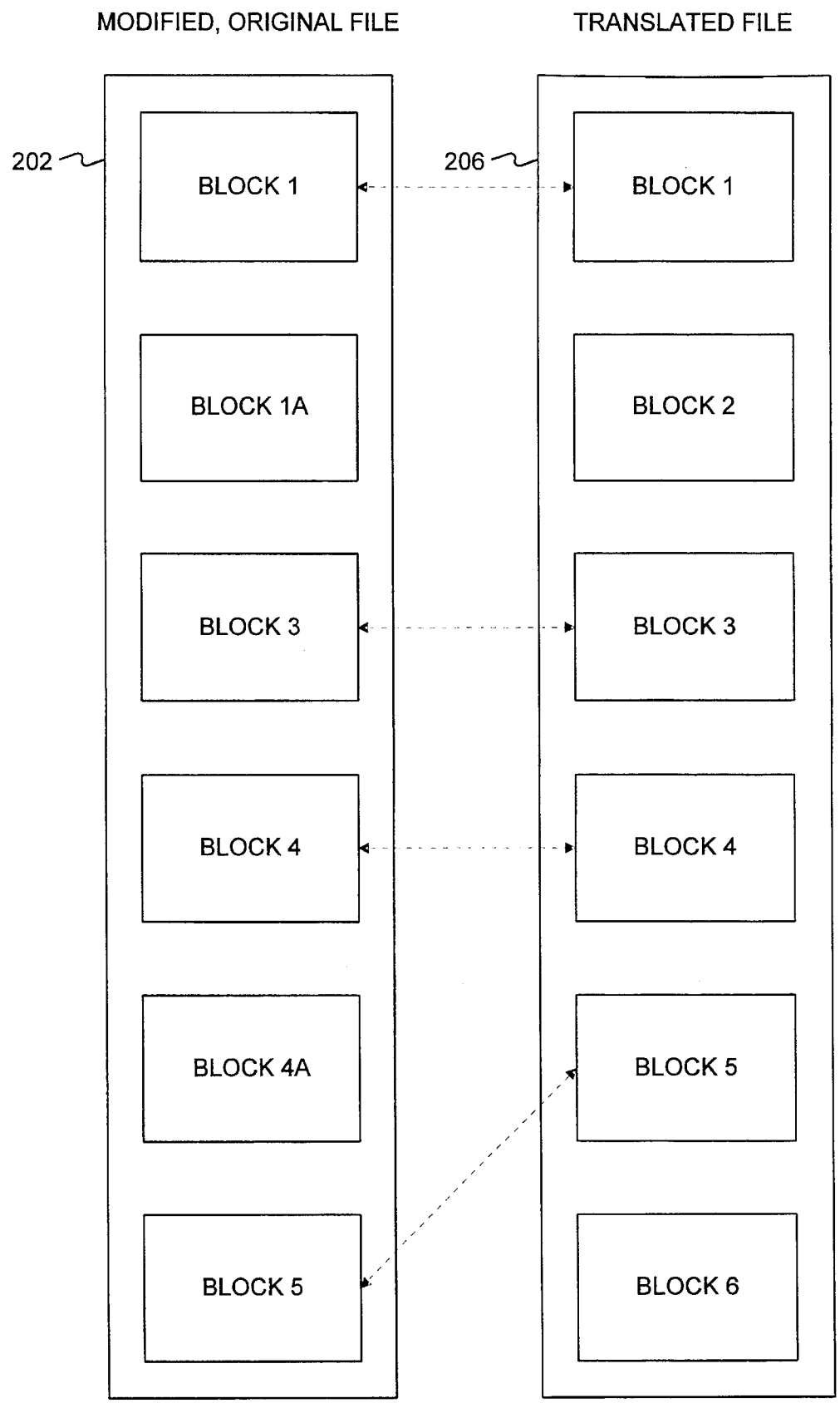
FIG. 4 is a schematic diagram showing the relationship between the modified original file and the translated file of FIG. 2.

FIG. 3 is an overview diagram of a preferred method used by the merge utility 210 to merge the modified original file 202 with the translated file 206 to produce the modified translated file 211. For reference purposes, FIG. 4 is a schematic diagram showing the relationship between the modified original file 202 and the translated file 206. These files contain a list of information stored as a sequence of named entities. In this example, the named entities are blocks 1, 1A, 3, 4, 4A, and 5 in the modified original file 202 and blocks 1, 2, 3, 4, 5, and 6 in the translated file 206.

Referring to FIG. 3, in step 301 the merge utility examines the modified original file 202 and the translated file 206 to identify the named entities (blocks) in each file. In, step 302, the merge utility compares the contents of the modified original file 202 to the contents of the translated file 206, searching for equivalent blocks. Equivalence may be determined by matching block identifiers or by matching the contents of blocks. In step 303, the merge utility copies the blocks from the modified original file 202 that are not in the translated file 206 to the modified translated file 211. Finally, in step 304, the merge utility maps the contents of the equivalent blocks. In other words, for each pair of equivalent blocks, one from the modified original file 202 and one from the translated filed 206, the contents of the block from the translated file 206 are changed to match the contents of the block from the modified original file 202. The resulting file is the modified translated file 211. The "mapping" operation is explained below in more detail.

FIGS. 5A–5D comprise a detailed flow diagram of a method used by the merge utility of FIG. 2 to merge the modified original file 202 with the translated file 206 to produce the modified translated file 211. Each file has a parallel format in that each file comprises a plurality of blocks, each block comprising a block identifier, a visual part, and a script part. The visual part comprises a plurality of visual attributes, e.g., a rectangle, a line, an ellipse, or a text frame, and the script part comprises a plurality of script attributes, e.g., event-response pairs.

In this example, a block represents a sequence of instructions directing the computer system to output data, the data including text and graphics. Each block is identified by a block identifier, as illustrated in FIG. 4. The visual attributes that make up the visual part include text frames and other objects having colors, sizes, and so on. The script attributes that make up the script part include event-response pairs. An event-response pair is equivalent to "if this happens, then do that." Based on input from the user, different events take place.

Figure 5A:
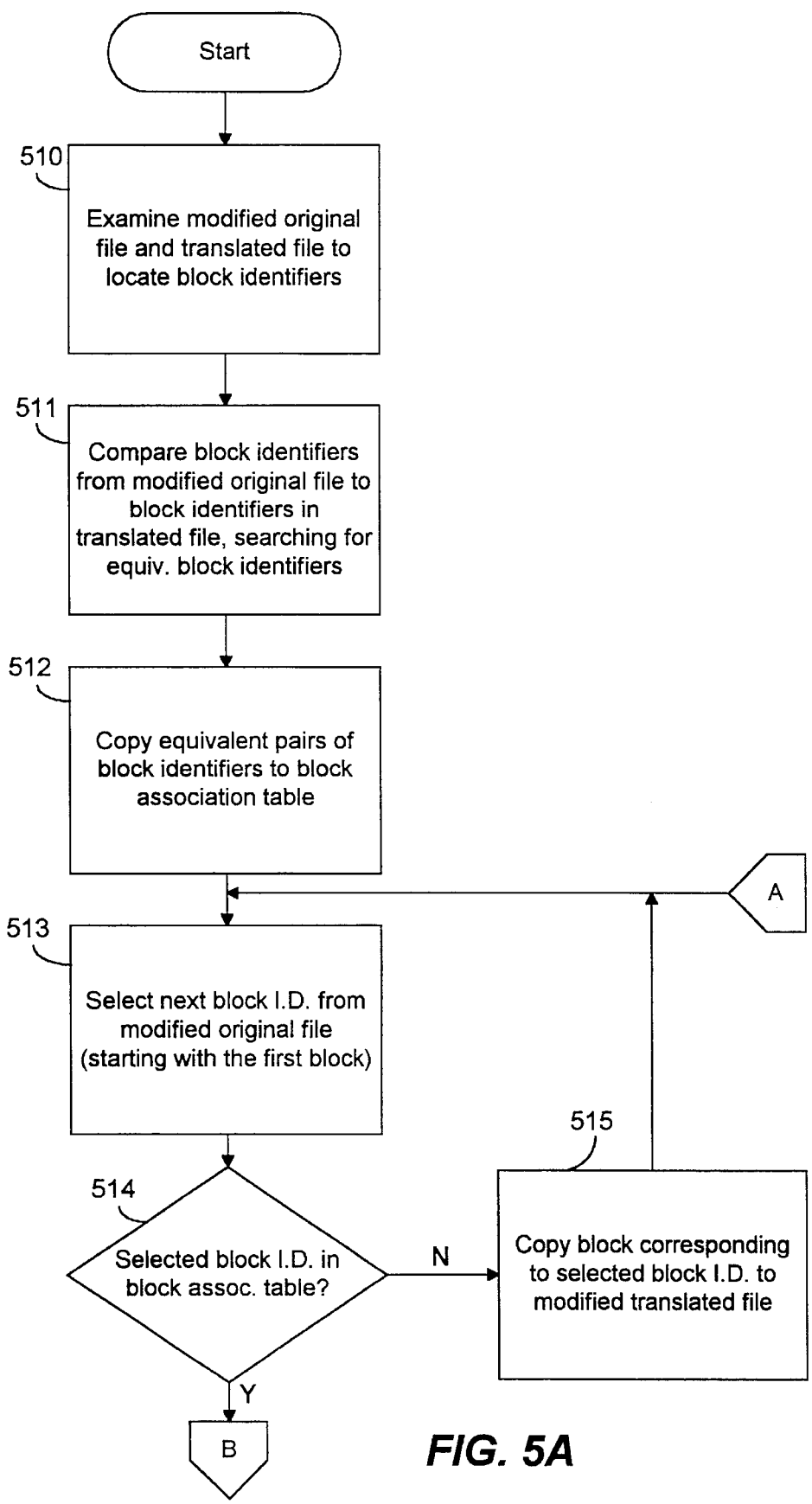
FIGS. 5A–5D comprise a detailed flow diagram of a method used by the merge utility of FIG. 2 to merge the modified original file with the translated file to produce the modified translated file.

Referring to FIG. 5A, in step 510 the merge utility examines the modified original file and the translated file to locate the block identifiers in each file. In step 511, the merge utility compares the block identifiers in the modified original file to the block identifiers in the translated file, searching for equivalent block identifiers. In step 512, the merge utility creates a block association table, which contains block entries. Each block entry contains an equivalent pair of block identifiers, such that one of the block identifiers in the pair is from the modified original file and the other block identifier in the pair is from the translated file. Alternatively, a table is not created; rather, another data structure is used for comparison purposes.

Referring again to FIG. 4, each file in this example comprises six blocks, but the six blocks from the modified original file do not match-up to the six blocks in the translated file. In a preferred embodiment, the merge utility creates a block association table containing four entries corresponding to blocks 1, 3, 4, and 5. Blocks 1A and 4A from the modified original file are not in the block association table because there is no corresponding block 1A or 4A in the translated file. Similarly, blocks 2 and 6 from the translated file are not in the block association table because there is no corresponding block 2 or 6 in the modified original file.

Referring again to FIG. 5A, in step 513 the merge utility selects the next block identifier from the modified original file, starting with the first block identifier. In step 514, the merge utility determines whether the selected block identifier is represented in the block association table. If the selected block identifier is not represented in the block association table, then there is no equivalent block in the translated file. In step 515, the merge utility copies the block corresponding to the selected block identifier from the modified original file to the modified translated file. If the selected block identifier is represented in the block association table, then the contents of the blocks associated with the entry in the block association table must be examined.

Figure 5B:
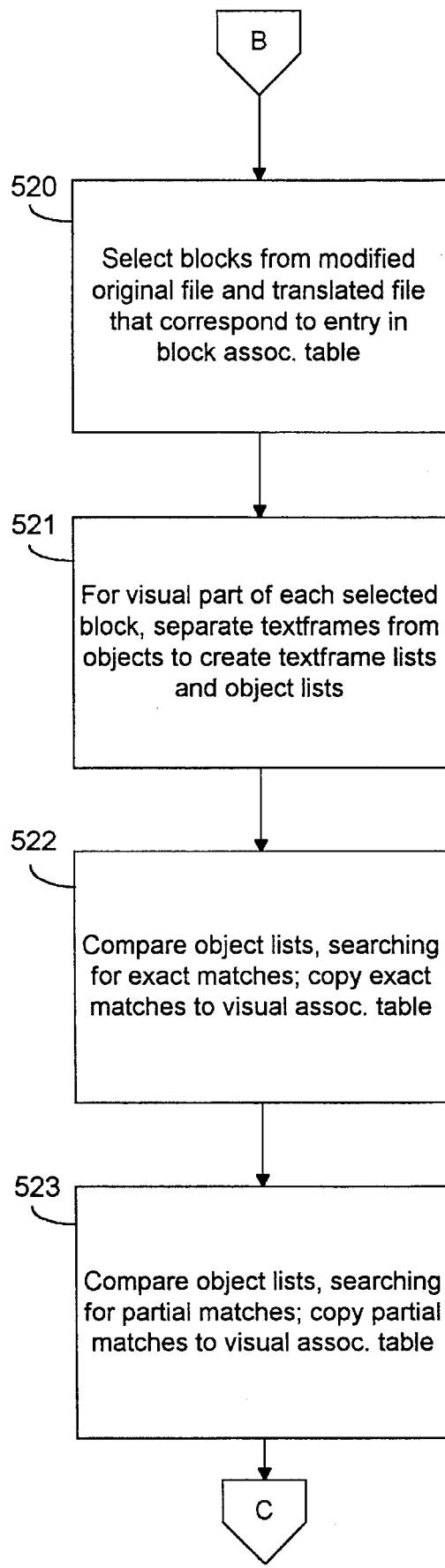
Figure 5C:
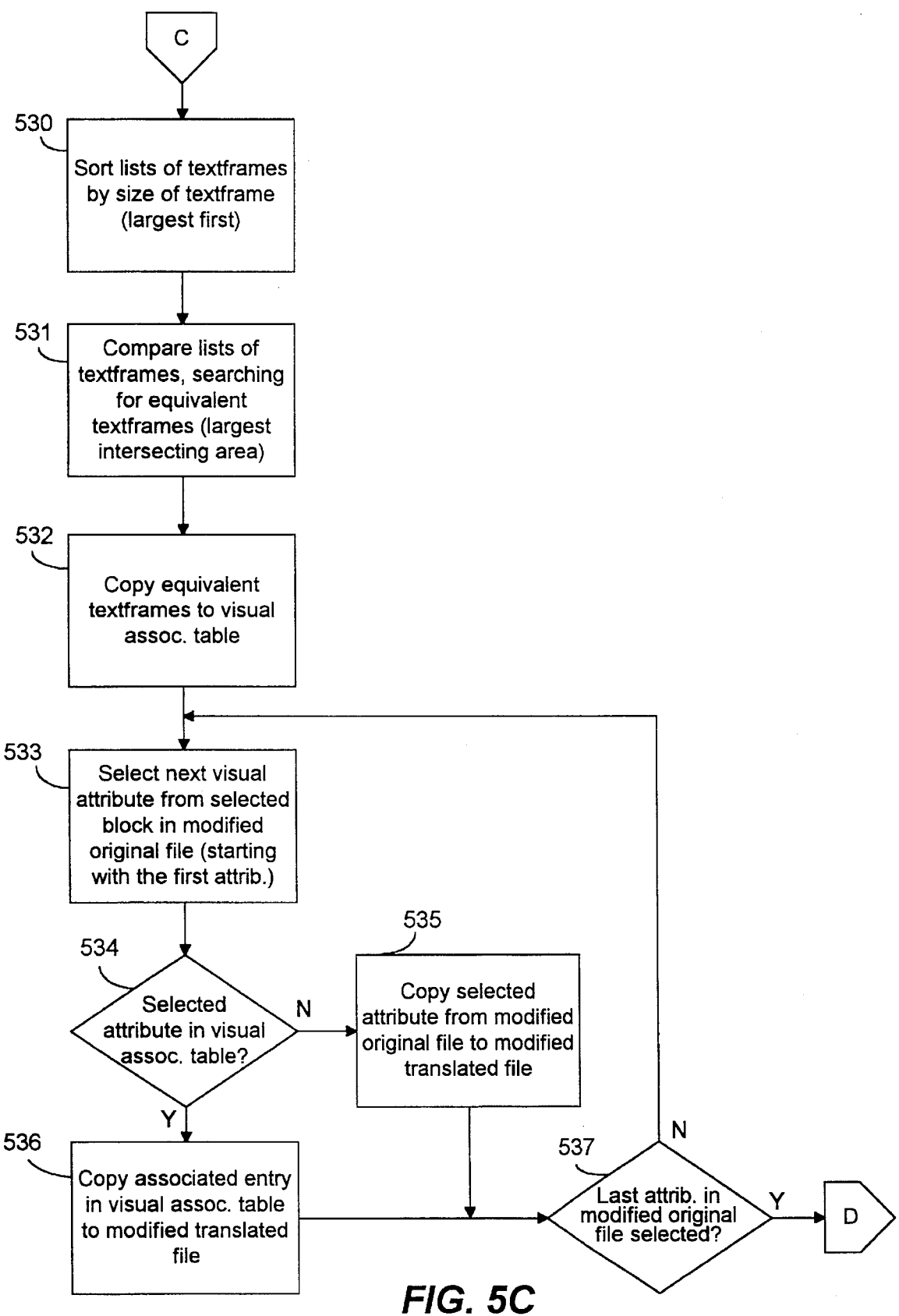
Figure 5D:
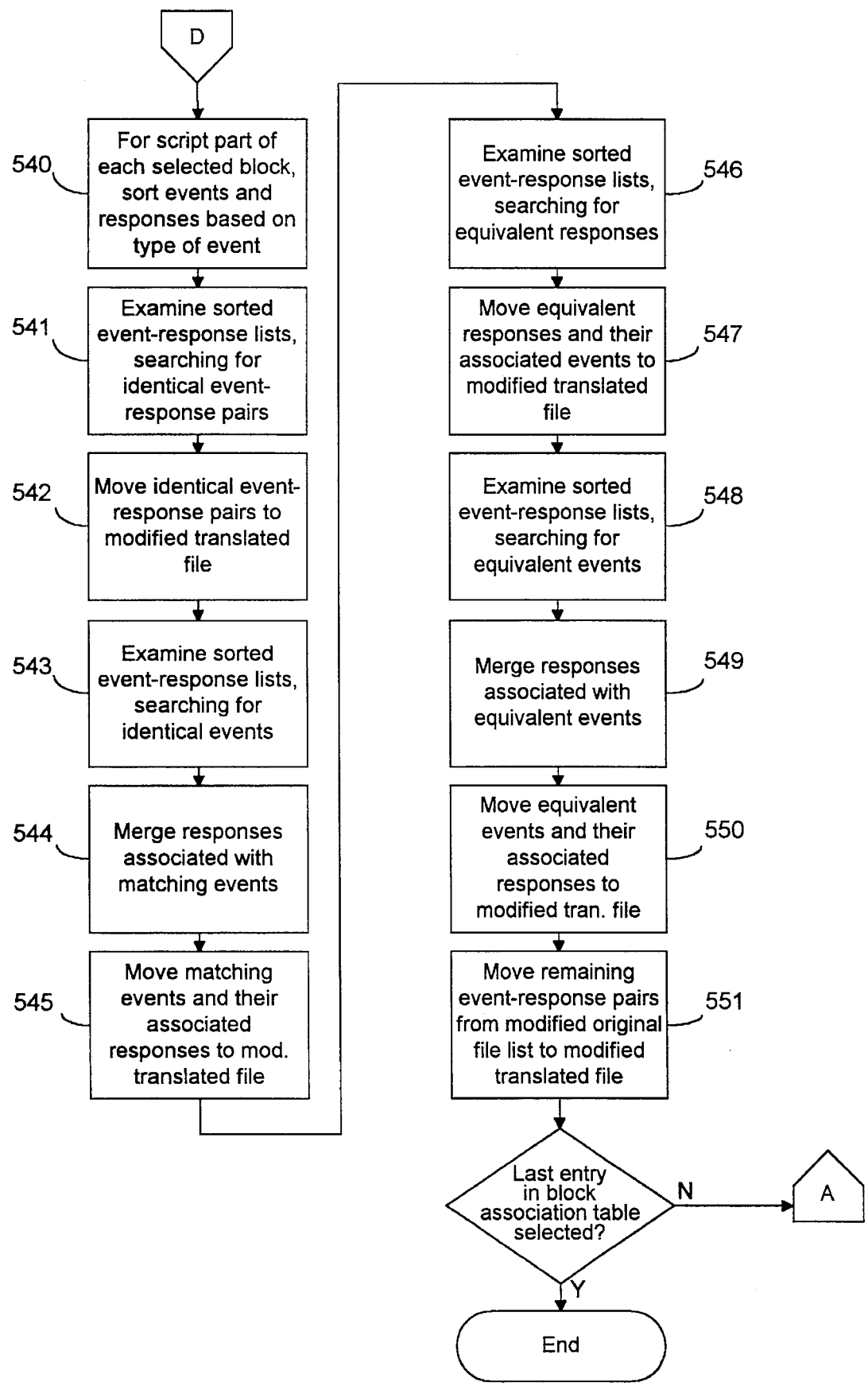

In FIGS. 5B, 5C, and 5D, the merge utility examines the contents of the blocks associated with an entry in the block association table. The contents of the blocks in the translated file are mapped to the contents of the corresponding blocks in the modified original file. In step 520 in FIG. 5B, the merge utility selects the blocks from the modified original file and the translated file that correspond to the entry in the block association table. As described above, each block comprises a block identifier, a visual part, and script part. The visual part contains a list of visual objects, which may be a rectangle, line, ellipse, or text frame (a rectangle frame with text inside).

To examine and compare the visual parts of the selected blocks, in step 521 the merge utility separates the text frames from the other objects to create two text frame lists and two objects lists. One of the text frame lists and one of the object lists corresponds to the selected block from the modified original file, while the other text frame list and the other object list correspond to the selected block from the translated file. In step 522, the merge utility compares the two object lists, searching for exact matches. The exact matches are then removed from their respective object lists, and placed in a visual association table. In step 523, the merge utility again compares the object lists, searching for partial matches. For each kind of visual object, e.g., rectangle, line, or ellipse, a partial match is defined by the object's attributes and not the object's position or size. This partial match concept can be further enhanced by using criteria such as intersection. The partially-matched objects are removed from their respective object lists and placed in the visual association table. Note that it is important for this algorithm to run through the object lists in the layering order (bottom-up) to match the correct objects.

Referring to FIG. 5C, in step 530 the merge utility sorts the two lists of text frames, placing the largest text frame at the top of each list. In step 531, the merge utility compares the two text frame lists, searching for equivalent text frames. Equivalent text frames have the largest intersecting area. If equivalent text frames are found, then the text frames are removed from their respective text frame lists and placed into the visual association table. Exact matches are not attempted for text frames because the text inside of the frame is written in different natural languages.

In step 533, the merge utility selects the next visual attribute from the selected block in the modified original file, starting with the first attribute. Essentially, the merge utility is walking through the original visual attribute list to determine which of the objects are in the visual association table. In step 534, the merge utility determines whether the selected attribute is represented in the visual association table. If the selected attribute is not represented in the visual association table, then in step 535 the merge utility copies the selected attribute from the modified original file to the modified translated file. If the selected attribute is represented in the visual association table, then in step 536 the merge utility copies the associated entry in the visual association table to the modified translated file. In step 537, the merge utility determines whether the last attribute in the modified original file has been selected. If the last attribute has not been selected, then steps 533 through 537 are repeated. If the last attribute in the modified original file has been selected, then the algorithm continues with step 540 of FIG. 5D.

In FIG. 5D, the merge utility compares the script parts of the selected blocks. Recall that each script part contains a list of event-response pairs. In step 540, the merge utility sorts each list of event-response pairs by event type. In step 541, the merge utility examines the sorted event-response lists, searching for identical event-response pairs. An identical event-response pair is one in which the event from the modified original file is the same as the event from the translated file, and the response from the modified original file is the same as the response in the translated file. In step 542, the merge utility moves the identical event-response pairs from their respective sorted list to the modified translated file.

In step 543, the merge utility examines the sorted event-response lists, searching for identical event pairs. An identical event pair is one in which the event from the modified original file is the same as the event in the translated file, but the responses may be different. In step 544, the merge utility merges the responses associated with the matching events. This step is carried out because a single event can have more than one response. When searching for identical events, the merge utility ignores localized components. A localized component is a component that has been translated to another language. A non-localized component is not capable of being translated to another language. An example of a non-localized component would be depression of the return key. In step 545, the merge utility moves the matching events and their associated responses to the modified translated file.

In step 546, the merge utility examines the sorted event-response lists, searching for equivalent responses. Even though two events are not identical, they may still be equivalent due to lingual changes. For example, a text event such as "good" in English may be equivalent to a text event such as "guten" in German. Because the present invention does not support any language translation abilities, a crude match is done based on responses attached to the events and the order of the events. Therefore, when attempting to find an equivalent event in the translated file, the first event with the same response as the modified original response is treated as the equivalent event. In step 547, the merge utility moves the equivalent responses and their associated events to the modified translated file.

In step 548, the merge utility examines the sorted event-response lists, searching for equivalent events. In step 549, the merge utility merges the responses associated with the equivalent events. As stated previously, to merge the responses, the response from the translated file is mapped to the response from the modified original file. In step 550, the merge utility moves the equivalent events and their associated responses to the modified translated file. In step 551, the merge utility removes the remaining event-response pairs from the modified original file list to the modified translated file. The event-response pairs that remain in the sorted event-response list for the translated file are not moved to the modified translated file. Alternatively, these event-response pairs are moved to the modified translated file, but they are marked for deletion. A reason for moving the unused event-response pairs to the modified translated file is to preserve them for future use.

After examining the script parts by performing steps 540–551, in step 552 the merge utility determines whether the last entry in the block association table has been selected. If the last entry has not been selected, the merging process loops back to step 513 of FIG. 5A. Steps 513–551 are repeated until all of the entries in the block association table have been selected. After all of the entries in the block association table have been selected, the merging process is complete.

Thus, the merge utility carries out the above-described steps to automatically incorporate modifications made to the original file 201 into the translated file to create the modified translated file. Because the modification process is on-going, many merges might occur before the final modifications are incorporated into the translated file.

As mentioned above, the present invention does not provide a method of automatically translating text from one natural language to another. The present invention does, however, keep a record of phrases and their translations so that if a phrase is added to the original file and a translation is available for the phrase, the present invention adds the translation of the phrase to the translated file instead of adding the phrase to the translated file and waiting for a human translator to translate the phrase. For example, suppose a new text box has been added to the original file. After creating a visual association table, the merge utility examines the table to see if the new text box is equivalent to any of the existing text box entries in the table. If so, the merge utility copies the translated version of the text box in to the translated file.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

I claim:

1. A method of developing multiple natural language versions of a computer program, the method comprising the steps of:

creating a first natural language version of the computer program, wherein the computer program contains instructions for controlling a computer system to output text in a first natural language;

translating the first natural language version to create a translated version of the computer program such that the translated version contains instructions for controlling the computer system to output text in a second natural language;

modifying the instructions in the first natural language version to create a modified version of the computer program;

comparing programmatically the instructions in the modified version with the instructions in the translated version to identify differences between the modified version and the translated version; and automatically incorporating the modifications made to the first natural language version into the translated version to create a modified translated version.

2. The method of claim 1 wherein the computer program, the modified version, and the translated version additionally contain instructions for controlling the computer system to output graphics.

3. The method of claim 1 wherein the step of automatically incorporating the modifications includes the steps of:

copying the instructions from the modified version to the translated version when the instructions are not present in the translated version;

deleting the instructions from the translated version when the instructions are not present in the modified version; and translating the copied instructions to the second natural language.

4. A method of developing multiple natural language versions of a computer program, the method comprising the steps of:

creating an original version of the computer program, wherein the computer program contains instructions for controlling a computer system to output text in a first natural language and instructions for controlling the computer system to output graphics;

translating the original version to create a translated version of the computer program such that the translated version contains instructions for controlling the computer system to output text in a second natural language and instructions for controlling the computer system to output graphics;

modifying the instructions in the original version to create a modified version of the computer program;

comparing the instructions in the modified versions with the instructions in the translated version to identify differences between the modified version and the translated version;

for each instruction in the modified version that is not in the translated version, copying automatically the instruction from the modified version to the translated version; and for each instruction in the translated version that is not in the modified version, deleting automatically the instruction from the translated version.

5. The method of claim 1 wherein the step of comparing the instructions in the modified version with the instructions in translated version further includes the step of creating an association table, the association table containing a list of equivalent pairs of instructions such that one of the instructions in the pair is from the modified version and the other instruction is from the translated version.

6. The method of claim 1 wherein the modified version and the translated version each comprise a plurality of identified blocks, each block having a block identifier, the method further including the steps of:

creating a block association table, the block association table containing a list of equivalent pairs of block identifiers such that one of the block identifiers in the pair is from the modified version and the other block identifier is from the translated version;

for each block identifier in the modified version that is not in the block association table, copying the corresponding ordered block from the modified version into the translated version; and for each block identifier in the translated version that is not in the block association table, removing the corresponding ordered block from the translated version.

7. A computer system for developing multiple natural language versions of a computer program comprising:

means for creating a first natural language version of the computer program, wherein the computer program contains instructions for controlling a computer system to output text in a first natural language;

means for translating the first natural language version to create a translated version of the computer program such that the translated version contains instructions for controlling the computer system to output text in a second natural language;

means for modifying the instructions in the first natural language version to create a modified version of the computer program;

means for comparing programmatically the instructions in the modified version with the instructions in the translated version to identify differences between the modified version and the translated version; and means for automatically incorporating the modifications made to the first natural language version into the translated version to create a modified translated version.

8. The computer system of claim 7 wherein the computer program, the modified version, and the translated version additionally contain instructions for controlling the computer system to output graphics.

9. The computer system of claim 7 wherein the means for automatically incorporating the modifications includes:

means for copying the instructions from the modified version to the translated version when the instructions are not present in the translated version;

means for deleting the instructions from the translated version when the instructions are not present in the modified version; and means for translating the copied instructions to the second natural language.

10. A computer-readable medium that causes a computer system to develop multiple natural language versions of a computer program, by performing the steps of:

creating an original version of the computer program, wherein the computer program contains instructions for controlling a computer system to output text in a first natural language and instructions for controlling the computer system to output graphics;

translating the original version to create a translated version of the computer program such that the translated version contains instructions for controlling the computer system to output text in a second natural language and instructions for controlling the computer system to output graphics;

modifying the instructions in the original version to create a modified version of the computer program;

comparing the instructions in the modified version with the instructions in the translated version to identify differences between the modified version and the translated version;

for each instruction in the modified version that is not in the translated version, copying automatically the instruction from the modified version to the translated version; and for each instruction in the translated version that is not in the modified version, deleting automatically the instruction from the translated version.

11. A computer-readable medium that causes a computer system to develop multiple natural language versions of a computer program, by performing the steps of:

creating a first natural language version of the computer program, wherein the computer program contains instructions for controlling a computer system to output text in a first natural language;

translating the first natural language version to create a translated version of the computer program such that the translated version contains instructions for controlling the computer system to output text in a second natural language;

modifying the instructions in the first natural language version to create a modified version of the computer program;

comparing programmatically the instructions in the modified version with the instructions in the translated version to identify differences between the modified version and the translated version; and automatically incorporating the modifications made to the first natural language version into the translated version to create a modified translated version.

12. A computer system for developing multiple natural language versions of a computer program comprising:

means for creating a first natural language version of the computer program, wherein the computer program contains instructions for controlling the computer system to output text in a first natural language and instructions for controlling the computer system to output graphics;

means for translating the first natural language version of the computer program to create a translated version of the computer program such that the translated version contains instructions for controlling the computer system to output text in a second natural language and instructions for controlling the computer system to output graphics;

means for modifying the instructions in the first natural language version to create a modified version of the computer program;

means for comparing the modified version and the translated version to identify differences between the modified version and the translated version;

means for creating an association table, the association table containing a list of equivalent pairs of instructions such that one of the instructions in the pair is from the modified version and the other instruction is from the translated version;

means for copying the instructions of the modified version from the modified version to the translated version when the instructions of the modified version are not represented in the association table; and means for deleting the instructions of the translated version from the translated version when the instructions of the translated version are not represented in the association table.

* * * * *